United States Patent
Paul et al.

(10) Patent No.: US 11,410,317 B2
(45) Date of Patent: Aug. 9, 2022

(54) FRAMELESS ANATOMY-BASED 2D/3D IMAGE REGISTRATION

(71) Applicant: Brainlab AG, Munich (DE)

(72) Inventors: Kristin Paul, Munich (DE); Robert Lucht, Munich (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 16/762,372

(22) PCT Filed: Apr. 12, 2019

(86) PCT No.: PCT/EP2019/059450
§ 371 (c)(1),
(2) Date: May 7, 2020

(87) PCT Pub. No.: WO2020/207597
PCT Pub. Date: Oct. 15, 2020

(65) Prior Publication Data
US 2021/0233252 A1 Jul. 29, 2021

(51) Int. Cl.
*G06T 7/168* (2017.01)
*G06T 5/50* (2006.01)
(Continued)

(52) U.S. Cl.
CPC ............... *G06T 7/168* (2017.01); *G06T 5/50* (2013.01); *G06T 7/11* (2017.01); *G06T 7/30* (2017.01);
(Continued)

(58) Field of Classification Search
CPC ..... G06T 5/50; G06T 7/11; G06T 7/30; G06T 7/168; G06T 2207/10088;
(Continued)

(56) References Cited

U.S. PATENT DOCUMENTS 5,827,187 A * 10/1998 Wang ................. G01R 33/563
600/419
7,688,998 B2 3/2010 Tuma et al.
(Continued)

FOREIGN PATENT DOCUMENTS

CN 103810754 5/2014
EP 1563799 8/2005
(Continued)

OTHER PUBLICATIONS

Vermandel et al., "Intrinsic 2D/3D registration based on a hybrid approach: use in the radiosurgical imaging process" Cellular and Molecular Biology, R. Wegmann, 2006, 52 (6), pp. 44-53.
(Continued)

*Primary Examiner* — Michael J Vanchy, Jr.
(74) *Attorney, Agent, or Firm* — Middleton Reutlinger

(57) ABSTRACT

A method for calculating a 3D representation of a vascular malformation of a vascular structure is provided. The method comprises: providing 2D X-ray image data of a vascular structure containing a contrast agent and having a vascular malformation, providing 3D image data of the vascular structure and transforming the 3D image data into transformed 2D image data, overlaying the 2D X-ray image data and the transformed 2D image data; calculating a correspondence between the 2D X-ray image data and the transformed 2D image data to determine a co-registration between the 2D X-ray image data and the 3D image data, determining in the co-registered 2D X-ray image data the vascular malformation, and calculating the 3D representation of the vascular malformation based on the determined vascular malformation of the co-registered 2D X-ray image data.

17 Claims, 9 Drawing Sheets

(51) Int. Cl.
  *G06T 7/30* (2017.01)
  *G06T 7/11* (2017.01)
(52) U.S. Cl.
  CPC .............. *G06T 2207/10088* (2013.01); *G06T 2207/10124* (2013.01); *G06T 2207/30016* (2013.01); *G06T 2207/30101* (2013.01)
(58) Field of Classification Search
  CPC . G06T 2207/10124; G06T 2207/30016; G06T 2207/30101; G06T 2207/10072; G06T 2207/10116
  See application file for complete search history.

(56) References Cited

U.S. PATENT DOCUMENTS

| | | | |
|---|---|---|---|
| 2005/0281385 A1* | 12/2005 | Johnson | A61B 34/20 378/163 |
| 2006/0036167 A1* | 2/2006 | Shina | A61B 6/481 600/433 |
| 2007/0127845 A1* | 6/2007 | Fu | G06T 7/32 382/294 |
| 2009/0005668 A1 | 1/2009 | West et al. | |
| 2016/0125597 A1* | 5/2016 | Bang | G01R 33/5635 600/419 |

FOREIGN PATENT DOCUMENTS

| | | |
|---|---|---|
| JP | 2011254861 | 12/2011 |
| WO | 2011119960 | 9/2011 |

OTHER PUBLICATIONS

Mitrovic et al., "3D-2D registration in endovascular image-guided surgery: evaluation of state-of-the-art methods on cerebral angiograms" Int J Comput Assist Radiol Surg. Feb. 2018;13(2):193-202. doi: 10.1007/s11548-017-1678-2.
"SmarBrush Angio" Software User Guide Revision 1.0; Copyright 2014, Brainlab AG, Germany.36 Pages.
"XNav" http://www.roiss.ru/products/xnav dated Dec. 14, 2018. 5 Pages.
Gorlachev, G.E., Software Tool to Delineate AVM over Raw 3D Angiographic Images (./assets/files/documents/36x48_Angio_2012. pdf), RSS-2012, P28.
Gorlachev G., "Software Tool For AVM Volume Definition Using Angiographic 2D Images Fusion To CT", (./assets/files/documents/ Poster_Angio.pdf), ISRS-2011, P2025.
European Intellectual Property Office; International Search Report and Written Opinion of Ser. No. PCT/EP2019/059450; 14 pages; dated Jun. 7, 2019.
Schmitt et al: "Reconstruction of blood propagation in three-dimensional rotational X-ray angiography (3D-RA)", Computerized Medical Imaging and Graphics, Pergamon Press, New York, NY, US, vol. 29, No. 7, Oct. 1, 2005, pp. 507-520, XPO27816660, ISSN: 0895-6111.
Steenbeke et al: "Analysis of the targeting uncertainty of a stereotactic frameless radiosurgery technique for arteriovenous malformation; incl. Supplementary data", Dec. 1, 2014, Radiotherapy and Oncology, Elsevier, Ireland, pp. 371-373, XP009513391, ISSN: 0167-8140.

* cited by examiner

FRAMELESS ANATOMY-BASED 2D/3D IMAGE REGISTRATION

FIELD OF THE INVENTION

The present invention relates to the calculation of a 3D representation of a vascular malformation of a vascular structure of an anatomy and to the registration of 2D and 3D medical images for said calculation. In particular, the present invention relates to a computer-implemented medical method of 2D/3D image co-registration or fusion, a corresponding computer program, a non-transitory program storage medium storing such a program, a computer for executing the program, as well as a medical image analysing system and a radiotherapy treatment system.

TECHNICAL BACKGROUND

An Arteriovenous malformation (AVM) is an abnormal connection between arteries and veins, which is typically bypassing the capillary system. The vascular anomaly or malformation is widely known because of its occurrence in the central nervous system (usually cerebral AVM), but can appear in any location of a human body, like for example in the vascular system of the human brain.

Although many AVMs are asymptomatic, they can cause intense pain or bleeding or lead to other serious medical problems. In particular, when AVMs occur in a human brain region it is of utmost importance to provide the medical practitioner, e.g. the surgeon or the radiotherapist treating such an AVM with surgery, a radiotherapy or radiosurgery treatment, with accurate and reliable information how the vascular malformation, in the brain of the patient looks like in three dimensions and where it is located. In particular, the shape of the vascular malformation and the locations of arterial inflow structure into the malformation and the venous outflow structures out of the malformation are of decisive importance for the success chances of the surgery or the radiotherapy/radiosurgery treatment.

The inventors of the present invention thus see the need of accurately calculating a 3D representation of a vascular malformation, e.g. an Arteriovenous malformation (AVM) in a human brain, out of medical images of the patient.

Nowadays, two-dimensional and three-dimensional images are fused in clinical practice using a localizer-based registration. For the delineation of vascular malformations, the localization is used. In another approach, the product Smartbrush Angio 1.0 of Brainlab AG supports frameless 2D/3D registration based on vessel segmentation. Furthermore, scientific literature discloses frameless 2D/3D registration based on DRR or MIP images, but without focusing on anatomy or a malformation and disadvantageously using frameless registration based on vessel centrelines or vessel segmentation.

The already known solutions of 2D/3D image registration entail the following disadvantages. First, patient burden, additional cost and time to treatment are increased as additional images need to be acquired for treatment planning and the localizer frame has to be attached to the patient's head. Furthermore, unfortunately, image registration is most accurate outside of the patient's skull. Moreover, in the prior art using image registration based on vessel segmentation, the registration result depends on the result of the vessel segmentation. Further, the previously mentioned scientific literature is only research literature and thus has low clinical evidence. The scientific literature does not focus on the site of malformation, and requires vessel segmentation or centreline extraction.

The inventors of the present invention have thus identified the need for a frameless anatomy based 2D/3D image registration which is properly accurate inside of the patient's skull, which does not depend on vessel segmentation results and which allow to focus on the side of malformation.

As will become apparent from the following detailed explanation, the result of the present invention can be used for planning a surgery or also for planning a radiotherapy treatment plan.

The present invention can be used e.g. for radiotherapy or radiosurgery procedures, such as the cranial/spine stereotactic radiosurgery treatment planning system, e.g. in connection with a system for image-guided radiotherapy such as VERO® and ExacTrac®, all products of Brainlab AG. The method and the program may also be used to supplement and/or update the existing Smartbrush Angio, a product of Brainlab AG.

Aspects of the present invention, embodiments, examples and exemplary steps are disclosed in the following. Different embodiments, examples and exemplary features of the invention can be combined in accordance with the invention wherever technically expedient and feasible.

Moreover, it is emphasized that any feature, element and/or step described in the following with respect to one aspect of the invention equally applies to any other aspect of the invention disclosed herein.

EXEMPLARY SHORT DESCRIPTION OF THE INVENTION

The present invention provides a new way of calculating a 3D representation of a vascular malformation thereby combining the advantages of 2D X-ray image data of the vascular structure containing the vascular malformation with the advantages of 3D image data of this vascular structure. In particular, the advantages of the 2D X-ray image data are the high resolution and the fact that differences between arteries and veins are highly visible for the medical practitioner, in particular with respect to the distribution evolvement of a contrast agent within the vascular structure. An embodiment example of such 2D X-ray are 2D DSA images. These advantages of the X-ray image data are transferred into the 3D image data of the same vascular structure when applying the method of the present invention. Thereby, the method combines the aforementioned advantages of the 2D X-ray image data with the advantage of the 3D data set namely that the vascular malformation, e.g. the AVM, can be advantageously represented and shown to the user in a spatial, 3D manner.

The present invention is of particular benefit if the vascular malformation is for example an AVM in a human brain. Since surgery and/or radiosurgery and/or radiotherapy is of utmost risk when it comes to the human brain, the benefits and advantages of the present invention, namely the precise calculation of a 3D representation of the vascular malformation is of great benefit in such a medical context. However, as will become apparent from the present disclosure, the method of the present invention is not limited to AVMs and is not limited to the brain region.

In the following, a short description of the specific features of the present invention is given, which shall not be understood to limit the invention only to the features or a combination of the features described in this section.

In particular, a computer-implemented medical method of 2D/3D image co-registration is presented. The 2D X-ray data are medical images of the vascular structure which contains the vascular malformation and a contrast agent within the vascular structure. For example, one or more 2D digital subtraction angiography (DSA) images can be used as 2D X-ray image data. Furthermore, 3D image data of this vascular structure are provided. Several different 3D imaging modalities may be used for generating said 3D image data. For example, magnetic resonance (MR) image data, computer tomography angiography (CTA) image data, or 3D digital subtraction angiography (3D DSA) image data may be used.

The 3D image data are transformed in this computer-implemented medical method into transformed 2D image data. Several different transformation possibilities can be used by the skilled person, and as examples particular, specific embodiments using maximum intensity projection (MIP) and/or digitally reconstructed radiography (DRR) for transforming the 3D image data into the transformed 2D image data will be explained in detail hereinafter.

Furthermore, the 2D X-ray image and the transformed 2D image data resulting from the previously provided 3D image data are overlaid. It should be noted that in the context of the present invention, the term "overlaying" these 2D images not only covers graphically overlaying these data on a display for the user, but also covers to overlay these data in a calculative manner. In an embodiment, in which the step of overlaying the 2D X-ray image data and the transformed 2D image data is carried out not graphically, but purely in a calculative manner, a degree/measure of similarity or correspondence between these 2D image data can be calculated. During the process of overlaying the 2D X-ray image data and the transformed 2D image data, a correspondence, for example a pixel-wise comparison/determination of the similarity, between the 2D X-ray image data and the transformed 2D image data is calculated. Thereby the co-registration between the 2D X-ray image data and the 3D image data is achieved by the method.

Moreover, in the computer-implemented medical method of the present invention, the vascular malformation is determined in the co-registered 2D X-ray image data. In exemplary embodiments thereof, this determination of the vascular malformation can be done purely automatically, for example by an image analysing algorithm automatically identifying the vascular malformation in the co-registered 2D X-ray image data. But this can also be done based on a user input, as will be explained in more detail hereinafter with respect to contouring the vascular malformation. Based on the determined vascular malformation, a 3D representation of the vascular malformation is calculated. This calculated data-based result can be used e.g. for planning a surgery or also for planning a radiotherapy treatment plan by the medical practitioner.

In other words, the method of the present invention comprises an image fusion of 2D and 3D image data that can employ image processing and visualization methods for the delineation of vascular malformations like AVMs. The delineation of the vascular malformation can be the 3D representation of the vascular malformation, which is calculated as has described hereinbefore and hereinafter.

In particular, in case of an AVM, the presented method allows for clearly distinguishing between parts of the vascular structure, which facilitates arterial inflow into the AVM and between parts of the vascular structure that facilitate venous outflow of the AVM. In particular, in an embodiment, 2D DSA image data can be used, which show a time sequence of the distribution of the contrast agent in the vascular structure. By selecting an image out of this time sequence of DSA images, a proper basis for determining, e.g. manually or automatically contouring, the malformation in such images can be selected for advantageously distinguishing between arterial inflow parts and venous outflow parts of the AVM. Based on such DSA images and based on such selection of an image out of said time sequence, a 3D representation of the AVM can be calculated by the computer-implemented medical method, which precisely and accurately describes in a 3D manner the object to be targeted by surgery, radiosurgery and/or radiotherapy.

As was explained hereinbefore, the transformation of the 3D image data into the transformed 2D image data can be carried out by several different methods like for example calculating a projection, like for example the maximum intensity projection (MIP) of the 3D image data or by calculating a reconstruction, for example a digitally reconstructed radiography (DRR) of the 3D image data. The respective transformation and/or reconstruction parameters used for such transformation and reconstruction can be used to optimize the overlaying of the 2D X-ray image data and the transformed 2D image data. Such an optimization may be carried out automatically thereby optimizing a calculated measure of image correspondence between the 2D X-ray image and the respectively transformed 2D image data for a plurality of sets of transformation and/or reconstruction parameters. Such an optimisation of the transformation parameters for achieving an optimal overlay in the sense of a high, pixel-wise correspondence between the overlaid images, can, however, also be carried out semi-automatically in combination with a user input, or purely manually. This will be described in more detail hereinafter.

It should be noted that initial values of the transformation parameters for this optimization may be suggested automatically or may be received via for example a user input. Details hereabout will also be explained in the context of exemplary embodiments hereinafter.

Summarizing, the method of the present invention advantageously facilitates a frameless, anatomy based 2D/3D image registration, which is accurate inside of the patient's skull, which does not depend on vessel segmentation results and which allows focusing on the site of the vascular malformation, e.g. an AVM in a human brain region. The same holds true for the program, the medical image analysing system and the other aspects of the present invention disclosed herein.

GENERAL DESCRIPTION OF THE INVENTION

In this section, a description of the general features of the present invention is given, for example by referring to possible embodiments of the invention.

According to a first aspect of the present invention, a computer-implemented medical method of 2D/3D image co-registration is presented. The method comprises the steps of providing 2D X-ray image data of a vascular structure containing a contrast agent (step S1), wherein the vascular structure contains a vascular malformation. Furthermore, the steps of providing 3D image data of the vascular structure (step S2), and transforming the 3D image data into transformed 2D image data (step S3) are comprised as well. Further, the 2D X-ray image data and the transformed 2D image data are overlaid and a correspondence between the 2D X-ray image data and the transformed 2D image data are calculated, thereby determining/achieving a co-registration between the 2D X-ray image data and the 3D image data (step S4). Moreover, the steps of determining in the co-registered 2D X-ray image data the vascular malformation (step S5) and calculating a 3D representation of the vascular malformation based on the determined vascular malformation of the co-registered 2D X-ray image data (step S6) are comprised by the method.

This computer-implemented medical method can e.g. be implemented as a software based on which a medical image analysing system may calculate the 3D representation of the vascular malformation, like e.g. an AVM.

The 2D X-ray image data may be retrieved from an external entity e.g. a computer, a network or a medical image storing system or may also be acquired by means of an X-ray imaging device as part of an embodiment of the invention. The X-ray images show the vascular structure of a patient wherein the images are generated during the application of a contrast agent within the vascular structure of the patient. Further, the provided 2D X-ray images also show the vascular malformation of the vascular structure of the patient. Moreover, also the 3D image data can be retrieved from an external entity e.g. a computer, a network or a medical image storing system or may also be acquired by means of an X-ray imaging device as part of an embodiment of the invention. As is apparent for the skilled reader, the provided 2D and 3D image data show the same vascular structure of the same patient.

In order to be able to properly overlay the images of both sources, the provided 3D image data are first transformed into 2D image data. In a subsequent step, the 2D X-ray image data and the transformed 2D image data are overlaid, wherein overlaying may be carried out in a graphical manner or may also be carried out by calculating a measure or value of correspondence or similarity between said two different 2D image data. Therefore, in the method of the present invention, a correspondence between the 2D X-ray image data and the transformed 2D image data is calculated. The correspondence may be calculated based on a graphical comparison between respective illustrations of the image data, but may also be carried out by e.g. calculating pixel-wise or pixel-based similarities between grey values of the 2D image data sets. By overlaying these image data and calculating the correspondence, a co-registration between the 2D X-ray image data and the 3D image data is effectively calculated/achieved. As is clear for the skilled person from the present disclosure, the 2D X-ray image data and the 3D image data are thus transformed into one coordinate system.

Moreover, with the present invention the co-registering of the 2D and 3D images is carried out in a frameless manner. Thus, the step of determining the co-registration between the 2D X-ray image data and the 3D image data can be carried out and/or is carried out as a frameless image registration. Therefore, in the present invention there is no need to attach a frame, no need to acquire additional frame, no pain is caused, a reduction of clinical workload, costs and time is achieved, a more accurate registration based on image information inside the brain is provided, in contrast to a localizer that is outside the skull.

As mentioned hereinbefore, the step of determining the vascular malformation in the co-registered 2D X-ray image data can be carried out automatically, semi-automatically partly involving a user input, or purely manually.

For example, regarding the fully automated determination of the vascular malformation, a machine-learning algorithm may be used to automatically identify in the co-registered 2D X-ray image data the vascular malformation. Such an algorithm might be carried out by an artificial intelligence (AI) module, which classifies certain regions within the co-registered 2D X-ray image data as belonging to the vascular malformation. The remaining regions of the vascular structure, as a consequence, would thus not belong to the vascular malformation. The result of such an automatic classification of different parts of the vascular structure being imaged in the 2D X-ray image data can be e.g. a contour and/or an outline and/or a boundary in the image. The contour and/or outline and/or boundary is thus a determined area which can be used as the vascular malformation for further steps of the method.

However, in another embodiment, a purely user-based determination of the vascular malformation in the co-registered 2D X-ray image can be used. For example, the co-registered 2D X-ray image data can be displayed on a computer display to the user and the user may then define for example a contour and/or an outline and/or a boundary of the vascular malformation. For example, the user may draw the contour and/or the outline and/or the boundary on a touch-sensitive display, which is then received by the computer and the corresponding computer-implemented method as user input data. Further details about such a contouring embodiment will be explained hereinafter in the context of the exemplary embodiment shown in FIG. 6.

The calculation of the 3D representation of the vascular malformation based on said determined vascular malformation then leads to the result that can beneficially be used by the medical practitioner and/or a computer for further processing. Due to the co-registered 2D X-ray image data and 3D image data, the representation of the vascular malformation can be calculated in the 3D coordination system. A very detailed and specific embodiment of such a calculation is shown in the context of the embodiment described in FIGS. 7 and 8. Furthermore, the resulting 3D object, i.e. the 3D representation of the vascular malformation, may be displayed to the user. It may also be sent in form of data to a device like e.g. a surgery robot or to a radiotherapy/radiosurgery device for automatically resecting or irradiating the vascular malformation.

However, also other calculation methods may be used for determining the 3D representation of the vascular malformation. For example, if the vascular malformation is automatically determined in the co-registered 2D X-ray image data by means of a computer algorithm, the computer may estimate a 3D form based on the determined vascular malformation and based on the provided 3D image data of the vascular structure. Such an estimation may calculate how the 3D representation of the vascular malformation may look like based on the data contained in the 3D data set. For example, the contour of the vascular malformation received by the user input in the embodiment shown in FIG. 6, may be expanded or supplemented in a calculative manner to a 3D object by rotating the contour around a rotational axis defined automatically or by the user. However, other and even more accurate ways of calculating the 3D representation of the vascular malformation will be detailed hereinafter.

According to an exemplary embodiment of the present invention, the 2D X-ray image data are 2D digital subtraction angiography (DSA) image data and the 3D image data of the vascular structure are magnetic resonance image data, for example T1, T2 or MRA image data, CTA image data, 3D DSA image data, or any combination thereof.

According to another exemplary embodiment of the present invention, the step of transforming the 3D image data into the transformed 2D image data (step S3) is carried out by calculating a projection and/or by calculating a reconstruction. An exemplary embodiment of the projection is calculating a maximum intensity projection (MIP) of the 3D image data. An exemplary embodiment of calculating a reconstruction is calculating a digitally reconstructed radiography (DRR) of the 3D image data.

The maximum intensity projection (MIP) is a method for 3D data that projects in the visualization plane the voxels with maximum intensity that fall in the way of rays traced from the viewpoint to the plane of projection, e.g. parallel or perspective rays. For example, MIP is regularly used for the detection of lung nodules in lung cancer screening programs, which use computed tomography (CT) scans. MIP enhances the 3D nature of the structures that are imaged in the 3D imaging data. MIP is well-known to the person skilled in the art.

Furthermore, a digitally reconstructed radiograph (DRR) is a simulation of a conventional 2D X-ray image, created from computed tomography (CT) data. A radiograph, or conventional X-ray image, is a single 2D view of total X-ray absorption through the body along a given axis. Also DRR is well-known to the person skilled in the art.

According to another exemplary embodiment of the present invention, an automatic optimization is carried out during the step of overlaying the 2D X-ray image data and the transformed 2D image data. In other words, the automatic optimization is carried out for the step of overlaying.

In particular, the transformation of the 3D image data into the transformed 2D image data uses a set of transformation parameters. Furthermore, the step of overlaying the 2D X-ray image and the transformed 2D image data comprises the step of automatically optimizing the transformation parameters thereby optimizing a measure of image correspondence between the 2D X-ray image and the respectively transformed 2D image data for a plurality of sets of transformation parameters.

In other words, an iterative optimization process can be used, which will be described in more detail hereinafter. Based on initial values of the transformation parameters, a first transformation is carried out leading to first transformed 2D image data. In order to optimize the measure of image correspondence between the first transformed 2D image data and the provided 2D X-ray image data, e.g. an image comparison can be carried out, which e.g. pixel-wise, or pixel-based, or region-wise, for example based on grey values, compares the 2D image data. In this way, a first value of a correspondence between the two 2D image data may be calculated. Further, in a second iteration of the optimization, adapted values of the transformation parameters may be used to create second transformed 2D image data, which can then again be compared pixel-wise or region-wise with the provided 2D X-ray image data. Also for this image comparison, a second value of image correspondence may be calculated. And it may be determined by the computer-implemented medical method which of the first and second value is higher, thereby indicating a higher correspondence between the two 2D image data. Thus, the corresponding transformation parameters leading to a higher degree of image correspondence could be selected for the further procedure. In further subsequent iterations of the optimization, like for example third, fourth, fifth and a sixth iterations etc., further adaptations of the transformation parameters could be carried out to come to optimal transformation parameters leading to a high degree of image correspondence between the respectively generated 2D transformation image data and the provided 2D X-ray image data.

According to another exemplary embodiment of the present invention, the set of transformation parameters being optimized are projection parameters, for example MIP parameters, and/or are reconstruction parameters, for example DRR parameters.

Initial values of these MIP parameters and/or the DRR parameters may be determined or selected based on the image acquisition parameters of the 2D X-ray image data. Such image acquisition parameters, i.e. said MIP parameters and/or the DRR parameters, may be two or more translational parameters, three rotational parameters, a scaling parameter, and/or a focal length. In an embodiment said parameters are encoded in a 4×4 matrix, i.e. a projection matrix.

According to another exemplary embodiment of the present invention, an initialization of the optimization process is carried out by either a user input or by automatically suggesting initial values of the transformation parameters.

In detail, in an exemplary embodiment, the method comprises the step of receiving a user input, for example via a graphical user interface, about initial values of the transformation parameters for the optimization. An exemplary, and very specific embodiment thereof, will be explained in the context of the embodiment shown in FIG. 5. The user may for example move on a display of the computer move or position the displayed transformed 2D image data relative to the displayed 2D X-ray image data on the display, which may define the initial transformation parameters with which the optimization process starts. The optimization may then be carried out automatically.

According to another exemplary embodiment of the present invention the user input via the graphical user interface is received by shifting or displacing the displayed transformed 2D image data within the image plane of the displayed 2D X-ray image data. As mentioned hereinbefore, a very specific and detailed embodiment thereof will be explained hereinafter in the context of FIG. 5.

According to another exemplary embodiment of the present invention, the method further comprises the step of suggesting, based on image acquisition parameters of the 2D X-ray image data, initial values of the transformation parameters for the optimization.

Such a suggestion may be calculated automatically by the computer-implemented medical method. The image acquisition parameters of the 2D X-ray image data, e.g. the 2D DSA image data, may be provided to the computer carrying out the computer-implemented medical method. This automatic suggestion may also be combined with the embodiment described hereinbefore about the user input regarding the initial values of the transformation parameters.

According to another exemplary embodiment of the present invention, the image acquisition parameters of the 2D X-ray image data are at least one of two or more translational parameters, three rotational parameters, a scaling parameter, and a focal length.

The image acquisition parameters may describe the relative position of the patient within the 2 imaging modalities, i.e. the 2D X-ray images and the 3D images, in particular in the respective coordinate systems. These coordination systems may be oriented or aligned at or relative to the X-ray tube and/or within an MR scanner (as an example of the device generating the 3D images for the method) for example at or relative to a patient table It may be noted that in a particularly preferred embodiment, the scaling parameter is calculated based on the focal length, which is known and provided to the computer calculating or carrying out the medical method of the present invention.

According to another exemplary embodiment of the present invention, the vascular structure shown in the images is part of a human brain and the method further comprises the further step of segmenting of at least one part of the human brain out of the 3D image data and/or the transformed 2D image data. Furthermore, only the at least one segmented part of the human brain is overlaid with the 2D X-ray image data in the step S4.

In other words, a so-called brain mask, i.e. a region of interest (ROI), is applied which effectively means that for the calculation and/or the displaying purposes, a reduction to the organ or tissue, e.g. vessels, which are of interest, is applied. Thus, e.g. skull bones are not used in the further procedure. This procedure may be carried out step wise. In a first step, only the entire brain is selected as ROI, in a second step only the vascular structure of the brain is selected as second ROI, in a third step only a part of the entire vascular brain structure may be selected as third ROI. In the embodiment shown in FIG. 4, such ROI selection can be done in the software with knob 44. Clearly, this is only one embodiment of the concept explained here. Therefore, only a subset of image data out of the provided 3D image data, namely the part, which has been segmented out of the original data set is used for the further procedure in the presented method. It should be noted that the segmentation step is preferably done on the 3D image data and the transformed 2D image data are less preferred. This segmentation aspect of the present invention is also depicted and elucidated with the explanation about the embodiment of FIG. 4.

According to another exemplary embodiment of the present invention, only the at least one segmented part of the human brain is displayed to the user together with the 2D X-ray image.

According to another exemplary embodiment of the present invention, the malformation is an Arteriovenous malformation (AVM) and wherein the 2D X-ray image data image the vascular structure and a distribution of the contrast agent in a distribution state, which allow for a distinction between arterial inflow into the AVM and venous outflow of the AVM.

It may be seen as one of the preferred applications of the present invention to apply the computer-implemented medical method to Arteriovenous malformation, in particular in a vascular structure of the human brain. Further, the 2D X-ray image data may be embodied as 2D DSA images in which a time sequence of evolving distribution of the contrast agent within the vascular structure is imaged over a certain period of time. The user or the software/the computer may select one or more images out of these DSA sequences, which show the imaged vascular structure and the contrast agent in a distribution stage where the contrast agent has already moved into the AVM through arterial inflow channels and has not yet moved out of the AVM through venous outflow channels. By selecting such a 2D X-ray image out of the time sequence it is ensured that the 3D representation of the vascular malformation calculated as a result of the presented method will, at least to a large extent, only contain the arterial inflow parts of the AVM, but advantageously not the venous outflow parts of the AVM.

Since this is desired as a target object for the medical procedure applied to the vascular structure by for example surgery, radiotherapy or radiosurgery, the medical practitioner may rely on this calculated 3D representation for resecting vascular tissue from a patient. In other words, this embodiment entails the advantages that the user will benefit from the clear distinction made possible between arterial inflow and venous outflow within the 2D X-ray images, e.g. the 2D DSA images. The resulting 3D object of the AVM may then only have arterial structures facilitating a proper surgery/radiotherapy/radiosurgery treatment of only arterial structures if the calculated 3D representation of the vascular malformation of the present invention is used.

According to another exemplary embodiment of the present invention, the 2D X-ray image data are a plurality of images showing a time sequence of the distribution of the contrast agent in the vascular structure and the method further comprising the step of identifying a best image out of the plurality of images with respect to the distinction between the arterial inflow into the AVM and the venous outflow of the AVM.

As has been mentioned hereinbefore, such an identification of the best image may be done by a user browsing through the displayed time sequence and the user may select a best image for the desired purpose. However, this may also be done automatically for example by a machine-learning algorithm or an artificial intelligence (AI) module, which classifies the images of the time sequence with respect to how properly they allow a distinction between the arterial inflow into the AVM and the venous outflow of the AVM.

According to another exemplary embodiment of the present invention, the method further comprises the step of summing all images of the plurality of images showing the time sequence of the distribution of the contrast agent up to a point of time at which the identified best image was generated.

The step of summing some or all images of the plurality of images up to the selected "best image" further enhances the optical differences between the arterial inflow parts and the venous outflow parts of the vascular malformation. This further facilitates a reliable and accurate determination of the vascular anatomy in the co-registered 2D X-ray image data and thus further improves the resulting 3D object, i.e. the 3D representation of the vascular malformation/anatomy. Additionally, there is less noise in the summed-up image. In one further embodiment, the summation can also be carried out as a weighted summation.

According to another exemplary embodiment of the present invention also a "best image" for carrying out the step of overlaying the data is identified out of said plurality of images. Thus, a best image for fusing the images of said two imaging modalities can be provided.

In particular, the image may be selected with which the step of overlaying and thus of co-registering seems to be promising. This may be done automatically, semi-automatically or purely manually by the user.

According to another exemplary embodiment of the present invention, the method further comprises the step of selecting a part of the provided 3D image data of the vascular structure for a further use in the method. The selection is carried out automatically, for example by automated segmentation without a user input, or by automated ATLAS segmentation in combination with a user input, or purely based on a received user input.

In other words, in this embodiment not the entire provided 3D image data are used for the step S3 of transforming and/or the step S4 of overlaying. Only the selected part of the original 3D data set is used and three different ways of selecting the part to be used are presented. In the exemplary embodiment shown in FIG. 4, it can be seen that a region of interest (ROI) is applied. Only the right carotid artery is afterwards displayed to the user. Such a selection may be done by the user via e.g. an ATLAS segmentation menu of a software, in which the user may select which segmented parts of the body shown in the images he wants to have exclusively displayed. Therefore, in this example, only the right carotid artery and the affiliated vascular structures are subsequently overlaid with the 2D DSA image shown in the exemplary embodiment of FIG. 4.

According to another exemplary embodiment of the present invention, the step of determining in the co-registered 2D X-ray image data the vascular malformation comprises the step of contouring the vascular malformation in the 2D X-ray image data. Furthermore, the 3D representation of the vascular malformation is calculated based on the contour of the vascular malformation in the 2D X-ray image data, which is received during the step of contouring.

The step of determining the vascular malformation in the co-registered 2D X-ray image may thus be seen in selecting an area of the image by defining an e.g. graphical contour or boundary of the vascular malformation in the 2D X-ray image. The contouring step may be carried out in various different ways. For example, the contouring may be carried out by a user drawing onto a graphical user interface a desired outline onto the co-registered 2D X-ray image. However, the contouring may also be carried out non-graphically, simply by calculating an outline of the vascular malformation, for example by means of a machine-learning algorithm identifying in a calculative manner the pixels in the 2D X-ray image which are supposed to represent the boundary of the vascular malformation.

According to another exemplary embodiment of the present invention, the method further comprises the step of receiving a user input associated with a contour of the vascular malformation in the 2D X-ray image data.

As is for example depicted in the embodiment shown in FIG. 6, an outline may be drawn onto the displayed 2D X-ray image. The method in this respect benefits from the high resolution of the 2D X-ray image and of the benefit of clearly distinguishing single blood vessels and therefore providing a high degree of details about the vascular structure for selecting the contour of the malformation. As has been explained hereinbefore, this benefit of the high resolution and of the optical distinguishability between arterial inflow and venous outflow of the vascular malformation is then transferred into the 3D data set by calculating the 3D representation of the vascular malformation. Due to the co-registered 2D X-ray image data and 3D image data, the representation of the vascular malformation can be calculated in the 3D coordination system. Thus, a 3D object of the vascular malformation can be generated, which very precisely takes into account the underlying vascular structure shown in the 2D X-ray image data.

According to another exemplary embodiment of the present invention, the provided 2D X-ray image data are at least a first and a second 2D X-ray image of the vascular structure, wherein the first image was acquired with different acquisition parameters, for example another acquisition angle, as compared to the second image. Furthermore, the method as presented herein is carried out for the first and the second 2D X-ray images.

This embodiment using at least two or even more 2D X-ray images of the vascular structure allows for a particular calculation of the 3D representation of the vascular malformation. As will become apparent from the more specific and detailed embodiment example shown in FIG. 7, such a contouring in two X-ray images of different image acquisition parameters, like for example the preferred embodiment of different angles, allows for estimating and thus of calculating a 3D representation of the vascular malformation based on said two different contours received. Particularly, two different DSA images of the brain of the patient as shown within FIG. 7 could be used.

According to another exemplary embodiment of the present invention, the 2D X-ray image data are 2D digital subtraction angiography image data, wherein the step of overlaying the 2D X-ray image data and the transformed 2D image data is carried out with a first and a second DSA image. Such an embodiment can be seen for example in the embodiment of FIGS. 7 and 8. The first DSA image was acquired with different acquisition parameters, e.g. another imaging angle, as compared to the second DSA image. Furthermore, the first and second DSA images are overlaid with transformed 2D image data from the same 3D image data resulting in a first and a second overlay, as can be gathered for example from the left picture shown in FIG. 7 and the right picture shown in FIG. 7. The method according to this embodiment further comprises the step of displaying the first and second 2D X-ray image data on a user interface. A screen of a computer may be used to display these images. Receiving a first and a second contouring input via the user interface is contained as a further step of the method. The first contouring input represents a first outline/boundary of the vascular malformation in the first 2D X-ray image data. Furthermore, the second contouring input represents a second outline/boundary of the vascular malformation in the second 2D X-ray image data. The method further comprises the steps of calculating a first 3D object based on the first outline received via the first contouring input and calculating a second 3D object based on the second outline received as a second contouring input. Moreover, the method comprises the step of intersecting, in a calculative manner, the first and second 3D objects thereby calculating the 3D representation of the vascular malformation. Based on the received contours in the left DSA image and the right DSA image of for example the embodiment of FIG. 7, the 3D representation of the vascular malformation as shown in FIG. 8 can be calculated by the method of the present embodiment.

According to another exemplary embodiment of the present invention, the method further comprises the steps of carrying out a texture based image analysis of the calculated 3D representation of the vascular malformation and the step of refining the calculated 3D representation of the vascular malformation using a result of said texture based image analysis.

It should be noted that in the context of the present invention, the term "texture" in the 3D data set shall be understood as a voxel-based, i.e. intensity-based analysis. This analysis may be carried out in adjacent image regions of a starting point within the 3D image data. As will be understood by the person skilled in the art, the "texture" as used in the context of the present invention does not relate to surface parameters of the calculated 3D representation. Thus, the texture-based image analysis identifies differences in values of image contrast or differences in grey values within the 3D data set. In other words, the texture-based image analysis of the calculated 3D representation identifies a granularity or graininess of the voxels or groups or regions of voxel or of a voxel and its neighbourhood, i.e. surrounding.

Alternatively, a thresholding of grey values could be carried out as the image analysis, in the sense of classifying all voxels, which are above and below a predetermined threshold value of the grey value According to another aspect of the present invention a program is presented which, when running on a computer or when loaded onto a computer, causes the computer to perform the method steps of the method according to any one of the preceding embodiments or aspects;
and/or a program storage medium on which the program is stored;
and/or a computer comprising at least one processor and a memory and/or the program storage medium, wherein the program is running on the computer or loaded into the memory of the computer;
and/or a signal wave or a digital signal wave, carrying information which represents the program;
and/or a data stream which is representative of the program.

A computer program stored on a device, like e.g. a disc, is a data file, and when the file is read out and transmitted it becomes a data stream for example in the form of a (physical, for example electrical, for example technically generated) signal. The signal can be implemented as the signal wave which is described herein. For example, the signal and/or the signal wave is constituted to be transmitted via a computer network, for example LAN, WLAN, WAN, for example the internet. The invention according to this aspect therefore may alternatively or additionally relate to a data stream representative of the aforementioned program.

According to another aspect of the present invention a medical image analysing system comprises the computer of the previous aspect.

According to another aspect of the present invention a radiotherapy treatment system for irradiating a vascular malformation, in particular an Arteriovenous malformation (AVM), with a treatment beam, is presented which comprises
a medical image analysing system according to the previous aspect,
a radiation treatment apparatus comprising a treatment beam source and a patient support unit.
wherein the computer is operably coupled to the radiation treatment apparatus for issuing a control signal to the radiation treatment apparatus for controlling at least one of
the operation of the treatment beam source or
the position of the patient support unit.

Definitions

In this section, definitions for specific terminology used in this disclosure are offered which also form part of the present disclosure.
Computer Implemented Method The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Providing Data

According to the present disclosure the terms providing data and retrieving data may be used synonymously. The expression "providing data" or "retrieving data" for example encompasses (within the framework of a computer implemented method) the scenario in which the data are determined by the computer implemented method or program. However, it also comprises receiving the data via e.g. a user input, and/or retrieving the data from a data storage device.

Determining data for example encompasses measuring physical quantities and transforming the measured values into data, for example digital data, and/or computing (and e.g. outputting) the data by means of a computer and for example within the framework of the method in accordance with the invention. The meaning of "providing data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "providing data" can therefore also for example mean waiting to receive data and/or receiving the data. The received data can for example be inputted via an interface. The expression "providing data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data provided by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the provision step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the provision step), the data can also be provided by performing the additional step of storing the data in a data storage medium (such as for example a ROM, RAM, CD and/or hard drive), such that they are ready for use within the framework of the method or program in accordance with the invention. The step of "providing data" can therefore also involve commanding a device to obtain and/or provide the data to be acquired. In particular, the provision step does not involve an invasive step which would represent a substantial physical interference with the body, requiring professional medical expertise to be carried out and entailing a substantial health risk even when carried out with the required professional care and expertise. In particular, the step of providing data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Registering/Co-Registering

The n-dimensional image of a body is registered, i.e. co-registered, when the spatial location of each point of an actual object within a space, for example a body part in an operating theatre, is assigned an image data point of an image (CT, MR, etc.) stored in a navigation system.

Image Registration/Image Co-Registration

Image registration, i.e. co-registration, is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

It should be noted that the terms registering/co-registering as well as image registration and image co-registration are used synonymously in the present disclosure.

Atlas/Atlas Segmentation

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

Treatment Beam

The present invention relates to the field of generating a treatment plan, based on which a treatment beam is controlled. The treatment beam treats body parts which are to be treated and which are referred to in the following as "treatment body parts". These body parts are for example parts of a patient's body, i.e. anatomical body parts.

The present invention relates to the field of medicine and for example to the use of beams, such as radiation beams, to treat parts of a patient's body, which are therefore also referred to as treatment beams. A treatment beam treats body parts which are to be treated and which are referred to in the following as "treatment body parts". These body parts are for example parts of a patient's body, i.e. anatomical body parts. Ionizing radiation is for example used for the purpose of treatment. For example, the treatment beam comprises or consists of ionizing radiation. The ionizing radiation comprises or consists of particles (for example, sub-atomic particles or ions) or electromagnetic waves which are energetic enough to detach electrons from atoms or molecules and so ionize them. Examples of such ionizing radiation include x-rays, high-energy particles (high-energy particle beams) and/or ionizing radiation emitted from a radioactive element. The treatment radiation, for example the treatment beam, is for example used in radiation therapy or radiotherapy, such as in the field of oncology. For treating cancer in particular, parts of the body comprising a pathological structure or tissue such as a tumor are treated using ionizing radiation. The tumor is then an example of a treatment body part.

The treatment beam is preferably controlled such that it passes through the treatment body part. However, the treatment beam can have a negative effect on body parts outside the treatment body part. These body parts are referred to here as "outside body parts". Generally, a treatment beam has to pass through outside body parts in order to reach and so pass through the treatment body part.

Reference is also made in this respect to the following web pages: http://www.elekta.com/healthcare_us_elekta_vmat.php and http://www.varian.com/us/oncology/treatments/treatment_techniques/rapidarc.

Moreover, it is emphasized that features, functions, elements and/or steps, which are described above and in the following with reference to one aspect of the invention, equally apply to any other aspect of the invention described above and in the following. Particularly, features and/or steps, as described above and in the following, with reference to the method according to the first aspect, equally apply the computer program according to the second aspect, to the computer-readable medium according to the third aspect, to the computer according to the fourth aspect and/or to the medical system according to the fifth aspect, and vice versa.

These and other aspects of the invention will be apparent from and elucidated with reference to the embodiments described hereinafter.

BRIEF DESCRIPTION OF THE DRAWINGS

In the following, the invention is described with reference to the appended figures which give background explanations and represent exemplary embodiments of the invention. The scope of the invention is however not limited to the specific features disclosed in the context of the figures, wherein FIG. 1 schematically shows a flow-chart illustrating steps of a computer-implemented medical method of 2D/3D image co-registration according to an exemplary embodiment of the invention;

in FIG. 7 according to an exemplary embodiment of the present invention;

The figures are schematic only and not true to scale. In principle, identical or like parts, elements and/or steps are provided with identical or like reference symbols in the figures.

DESCRIPTION OF EMBODIMENTS

Figure 1:
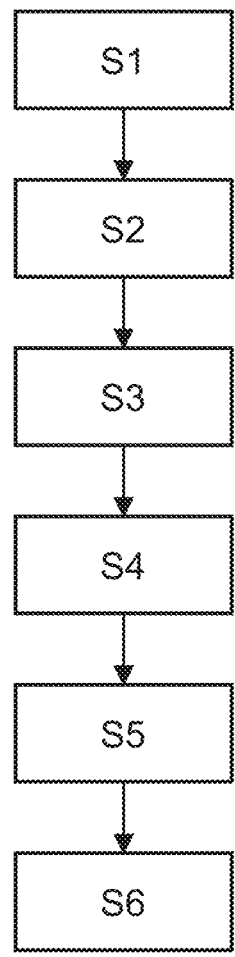

FIG. 1 schematically shows a flow-chart illustrating steps of a computer-implemented medical method of 2D/3D image co-registration according to an exemplary embodiment of the invention. It provides a new way of calculating a 3D representation of a vascular malformation thereby combining the advantages of 2D X-ray image data of the vascular structure containing the vascular malformation with the advantages of 3D image data of the same vascular structure. In particular, the advantages of the 2D X-ray image data are the high resolution and the fact that differences between arteries and veins are highly visible for the medical practitioner or for an computer algorithm analysing such images, in particular with respect to the distribution evolvement of a contrast agent within the vascular structure. Thus, the method combines the aforementioned advantages of the 2D X-ray image data with the advantage of the 3D data set namely that the vascular malformation, e.g. an AVM, can be advantageously represented and shown to the user in a spatial, 3D manner. This is of great help for medical practitioners when planning any treatment of the vascular malformation.

The method of FIG. 1 comprises the steps of providing 2D X-ray image data of a vascular structure containing a contrast agent, step S1. Therein the vascular structure contains a vascular malformation. Furthermore, the steps of providing 3D image data of the vascular structure, step S2, and transforming the 3D image data into transformed 2D image data, step S3, are comprised as well. Further, the 2D X-ray image data and the transformed 2D image data are overlaid and a correspondence between the 2D X-ray image data and the transformed 2D image data are calculated, thereby determining/achieving a co-registration between the 2D X-ray image data and the 3D image data, i.e. step S4. Moreover, the steps of determining in the co-registered 2D X-ray image data the vascular malformation, step S5, and calculating the 3D representation of the vascular malformation based on the determined vascular malformation of the co-registered 2D X-ray image data, step S6, are comprised by the method.

With the method as described in FIG. 1, the co-registering of the 2D and 3D images is carried out in a frameless manner. Due to the co-registered 2D X-ray image data and 3D image data, the representation of the vascular malformation can be calculated in the 3D coordination system. This method is of particular benefit if the vascular malformation is for example an AVM in a human brain. Since surgery and/or radiosurgery and/or radiotherapy is of utmost risk when it comes to the human brain, the advantages of the present invention, namely the precise calculation of a 3D representation of the vascular malformation is of great benefit in this medical context. However, the method of FIG. 1 is not limited to AVMs and is not limited to the brain region.

Moreover, with the method of FIG. 1 the registering/co-registering of the 2D and 3D images is carried out in a frameless manner. Thus, the step of determining the co-registration between the 2D X-ray image data and the 3D image data can be carried out and/or is carried out as a frameless image registration. Therefore, in the present invention there is no need to attach a frame, no need to acquire additional frame, no pain is caused, a reduction of clinical workload, costs and time is achieved, a more accurate registration based on image information inside the brain is provided, in contrast to a localizer that is outside the skull.

The method of FIG. 1 benefits from the high resolution of the 2D X-ray image and from the benefit of a clear distinguishability of single blood vessels therein and therefore provides a high degree of details about the vascular structure for selecting the contour of the malformation. This benefit of the high resolution and of the optical distinguishability between arterial inflow and venous outflow of the vascular malformation is then transferred into the 3D data set by calculating the 3D representation of the vascular malformation. Due to the co-registered 2D X-ray image data and 3D image data, the representation of the vascular malformation can be calculated in the 3D coordination system.

Figure 2:
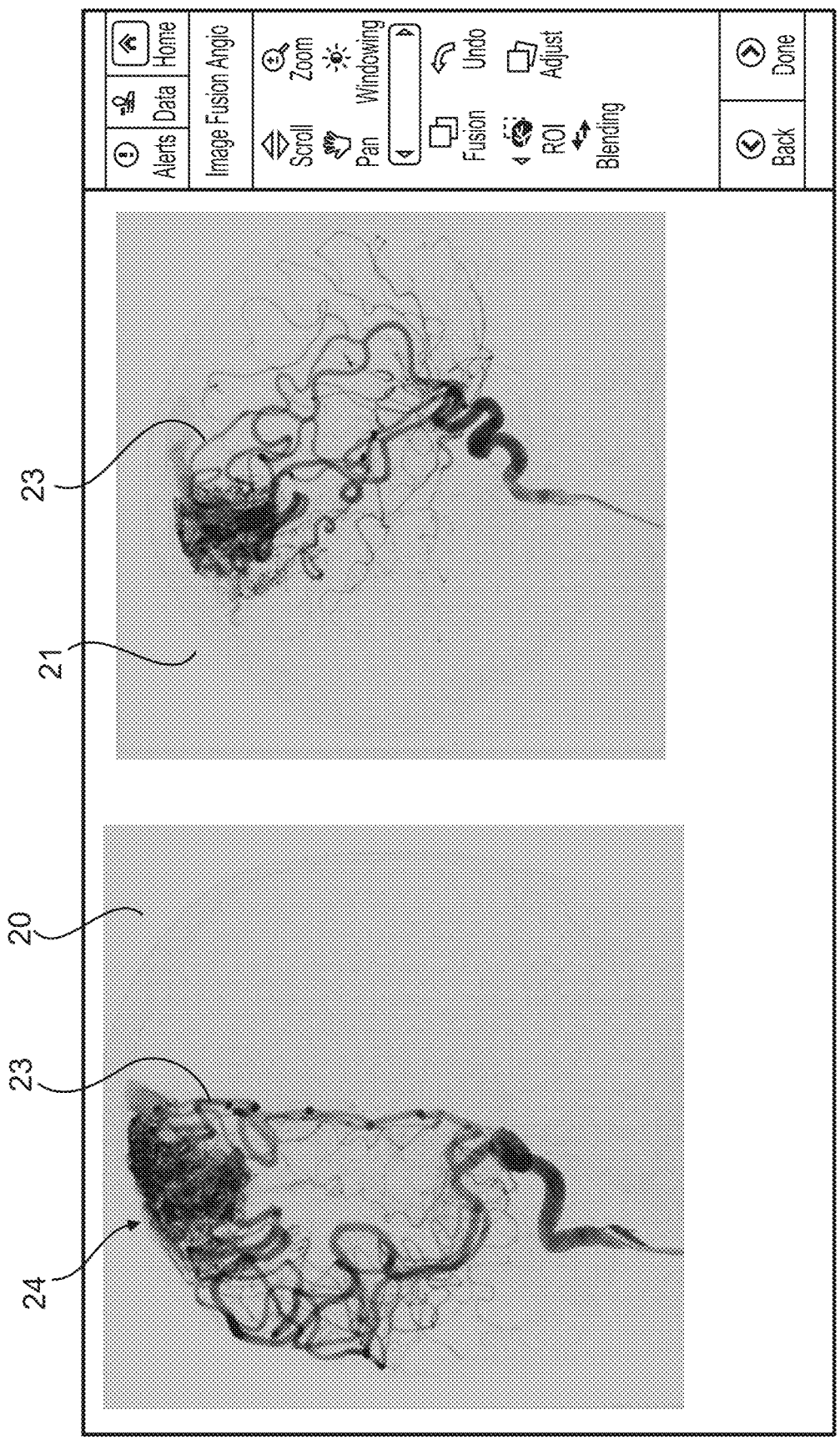
FIG. 2 schematically shows two different 2D DSA images of the vascular structure of a human brain containing a contrast agent and a vascular malformation and imaged from different angles, frontal and lateral, as can be used in exemplary embodiments of the present invention.

FIG. 2 schematically shows two different 2D DSA images 20, 21 of the vascular structure 23 of a human brain containing a contrast agent shown in dark and a vascular malformation 24. Both DSA images are imaged from different angles, the left image 20 is a frontally captured DSA and the right image 21 is a laterally captured DSA. Thus, 2D X-ray image data are provided as described for step S1 in e.g. the embodiment of FIG. 1.

Figure 3:
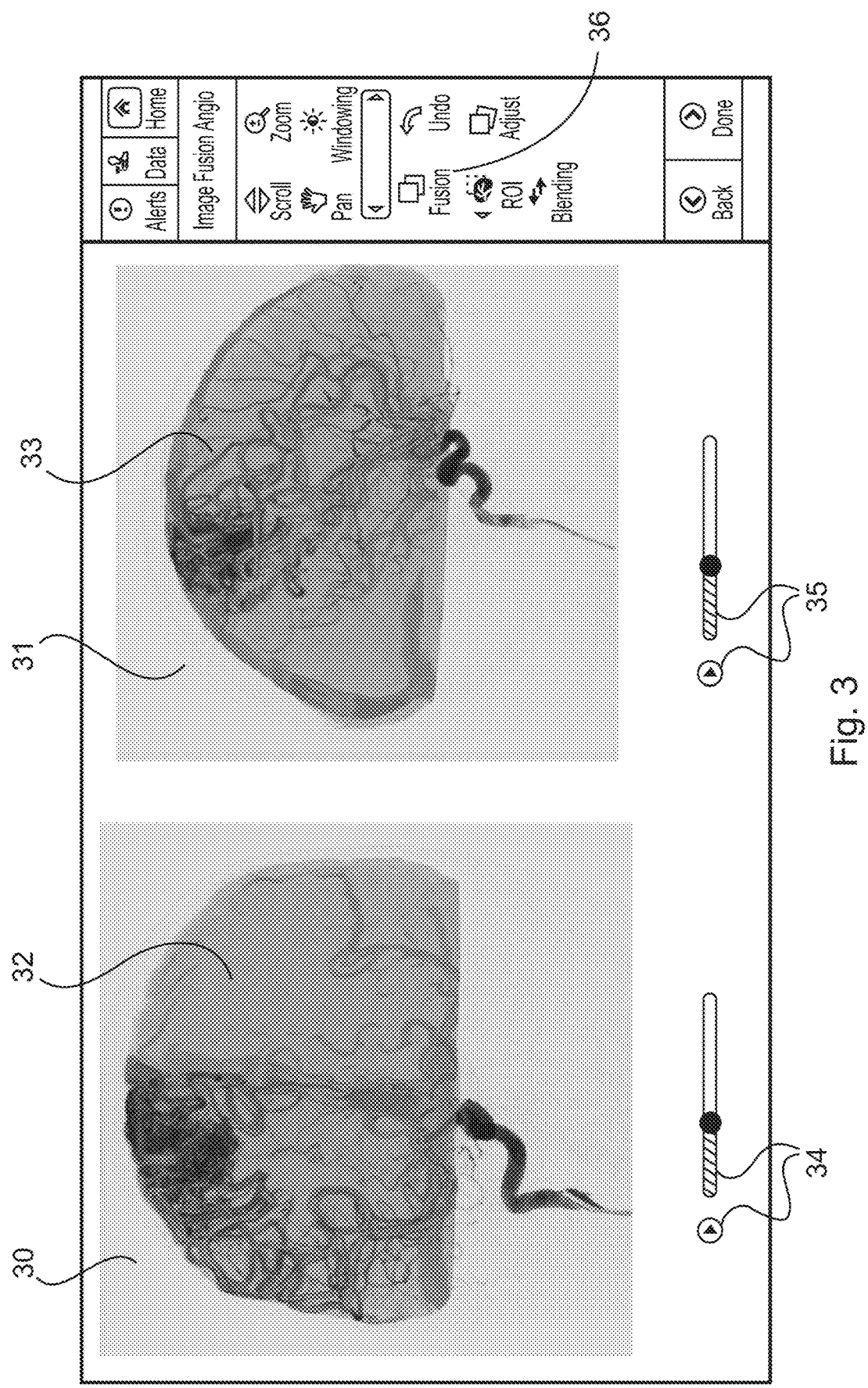
FIG. 3 schematically shows two different DSA pictures overlaid with a maximum intensity projection (MIP) of a 3D time of flight (TOF) MR image of the same human brain containing a vascular malformation as used in exemplary embodiments of the present invention.

In FIG. 3 also two different DSA pictures 30, 31 are shown, which are each overlaid with a maximum intensity projection (MIP) 32, 33 of a 3D time of flight (TOF) MR image of the same human brain. Therefore, the software used for FIG. 3 has already transformed the 3D image data, i.e. the 3D time of flight (TOF) MR image, into transformed 2D image data by calculating a projection, in particular the MIP of the 3D image data. The MIP 32, 33 may be displayed in colour to the user, where the intensity of the colour may correspond or correlate to the grey value of the corresponding voxel in the underlying 3D data set.

The overlays shown in FIG. 3 may further be improved by starting an automatic optimization of the projection parameters, with which the MIP has been generated. When pressing the knob 36 the software automatically optimizes the MIP parameters thereby optimizing a measure of image correspondence between the 2D X-ray image 30 and the respectively transformed 2D image 32 for a plurality of sets of MIP parameters. The same holds true for images 31 and 33 if knob 36 is pressed. In this way, an iterative optimization process can be used as has been described hereinbefore in detail. It should be noted that in order to optimize the measure of image correspondence between a transformed 2D image and a provided 2D X-ray image, e.g. an image comparison can be carried out, which e.g. pixel-wise or region-wise compares the 2D image data. In this way, a value of a correspondence between the two 2D image data may be calculated and may be compared with other values calculated for other MIP parameters, thus leading to an optimal result. With knobs 34 and 35 the 2D X-ray image data 30, 31, which are a plurality of images showing a time sequence of the distribution of the contrast agent in the vascular structure, can be replayed. Thus, this allows an identification of a best image out of the plurality of images with respect to the distinction between the arterial inflow into the malformation and the venous outflow of the malformation.

Figure 4:
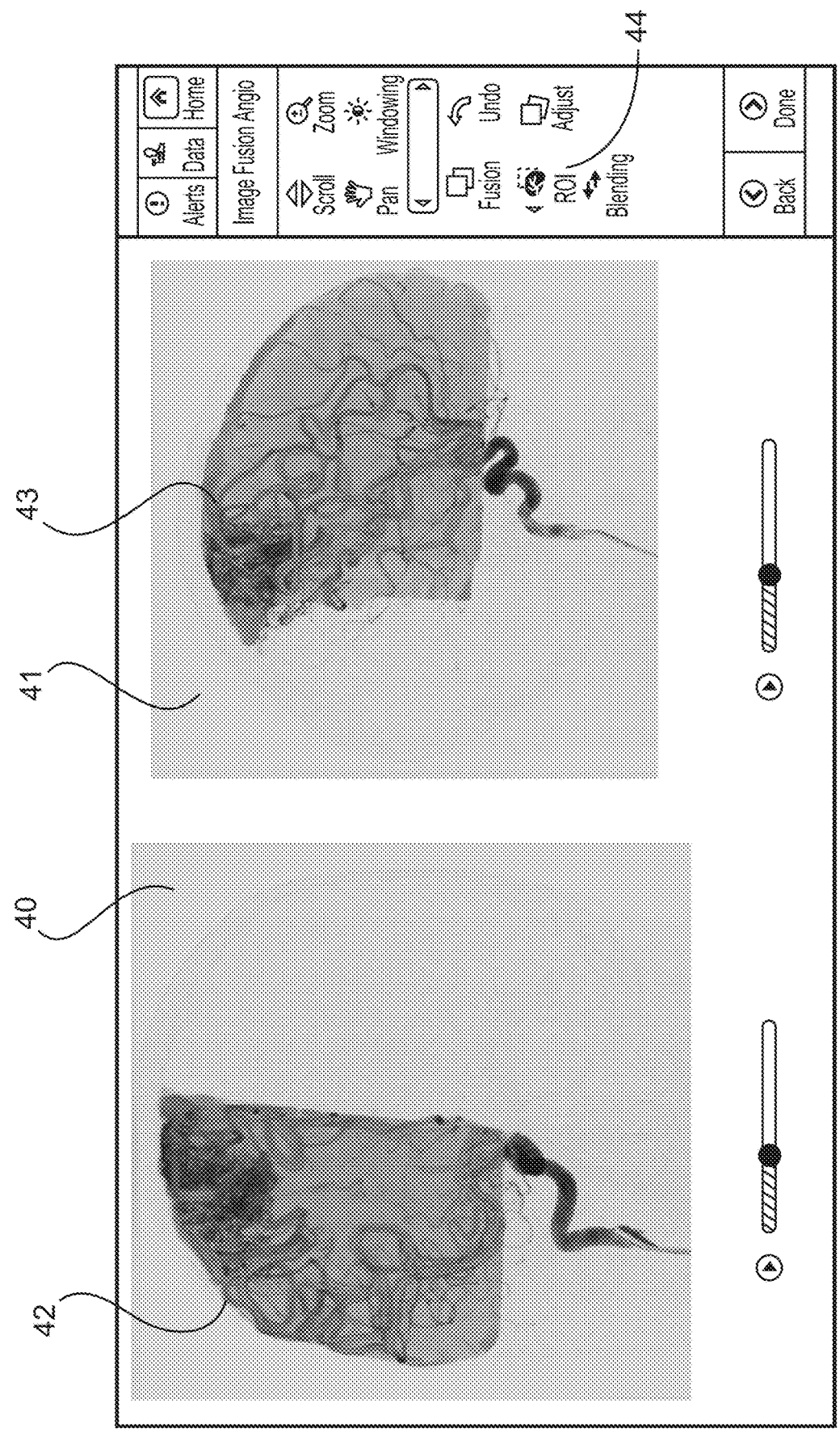
FIG. 4 schematically shows the application of a region of interest by means of segmentation since only the right Arteria carotis is displayed as used in exemplary embodiments of the present invention.

FIG. 4 schematically shows the application of a region of interest (ROI) by means of segmentation. FIG. 4 shows a frontally and a laterally captured DSA image 40, 41 that are overlaid with a respective MIP projection 42, 43. The user can select a part of the provided 3D image data of the vascular structure for the further procedure. Thereby the selection is carried out by automated ATLAS segmentation in combination with a user input that can be provided via ROI button 44. As can be gathered from FIG. 4 only the right Arteria carotis is displayed since this was selected previously via ROI button 44 as was segmented out of the underlying 3D data set.

Figure 5:
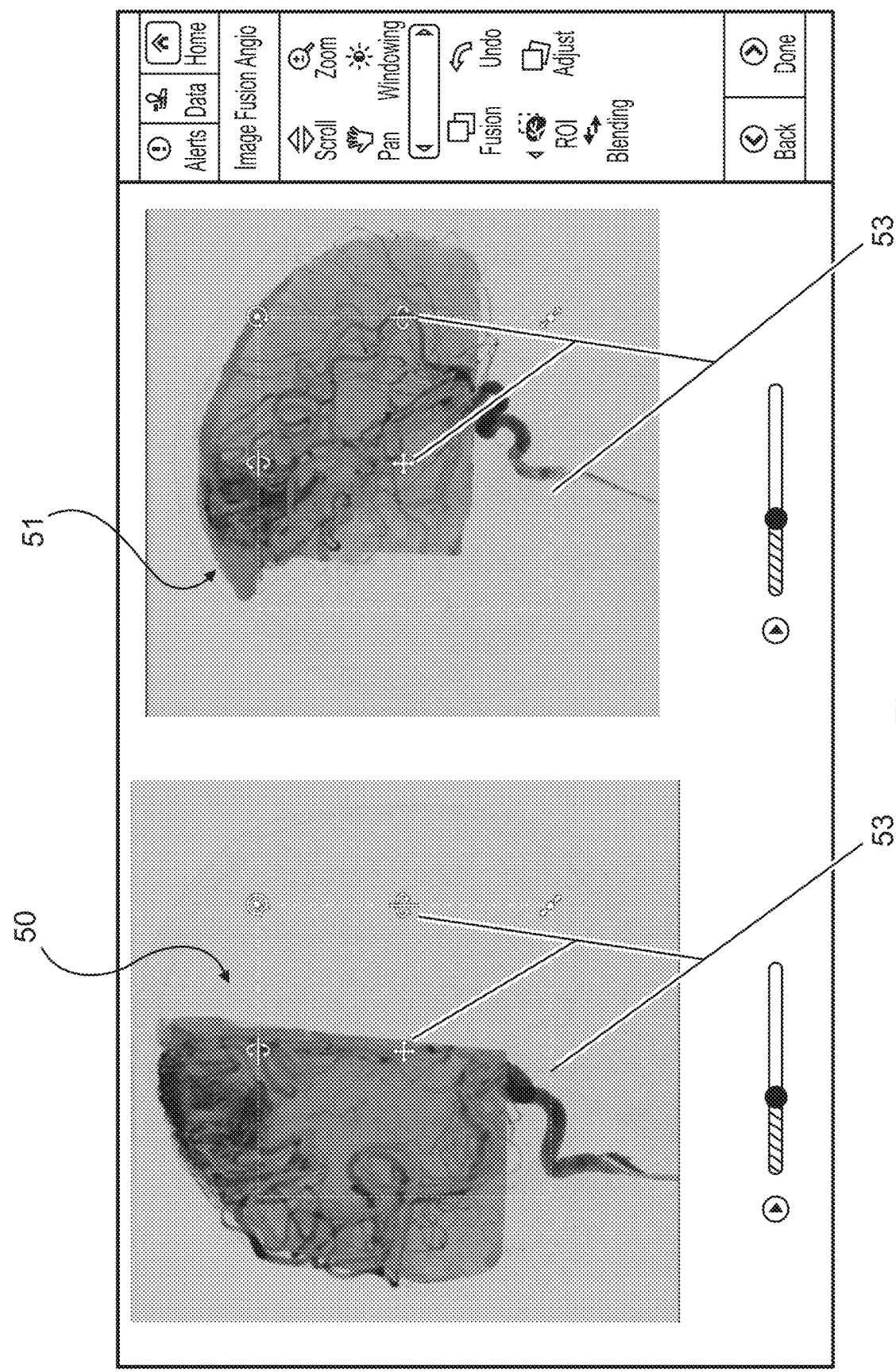
FIG. 5 schematically shows an embodiment of the present invention in which the overlay of the 2D X-ray image data and the transformed 2D image data as depicted for example in FIG. 4 can be adjusted by a user via a graphical user interface (GUI) according to an exemplary embodiment of the present invention.

FIG. 5 schematically shows an embodiment of the present invention in which the overlays 50, 51 of the 2D X-ray image data and the transformed 2D image data as depicted for example in FIG. 4 can be adjusted by a user via a graphical user interface (GUI) 52, 53 according to an exemplary embodiment of the present invention. As has been explained hereinbefore, this allows receiving a user input, about initial values of the transformation parameters for the optimization. I.e. the optimization of the transformation parameters can be initiated with this GUI 52, 53 thereby triggering the optimization of a measure of image correspondence between the 2D X-ray image data and the respectively transformed 2D image data for a plurality of sets of transformation parameters or achieving a co-registration without the need to further optimize.

Figure 6:
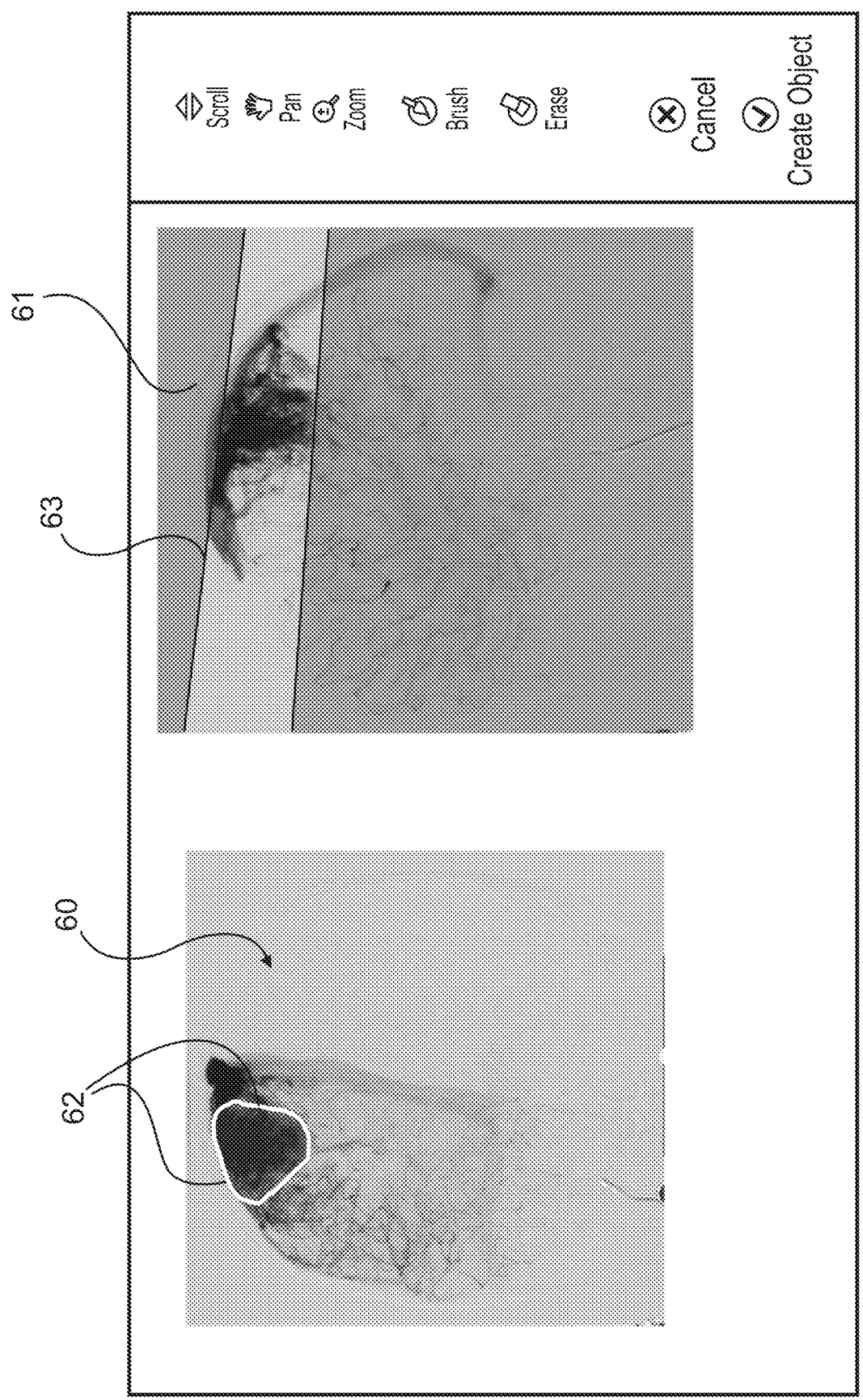
FIG. 6 schematically shows on the left side an embodiment of the present invention regarding the determination/contouring of the vascular malformation in a frontal 2D X-ray image. On the right side projected rays are shown in a lateral image, which rays are based on the contour received in the frontally captured DSA image of the left-hand side.

FIG. 6 schematically shows 2 DSA images 60, 61. On the left side an embodiment of the present invention regarding the determination/contouring 62 of the vascular malformation in a frontally captured 2D X-ray image is shown. On the right side projected rays 63 are shown in a laterally captured image, which rays are based on the contour 62 received in the frontally captured DSA image via a user input. The 3D representation of the vascular malformation is calculated based on the contour of the vascular malformation in the 2D X-ray image data.

Figure 7:
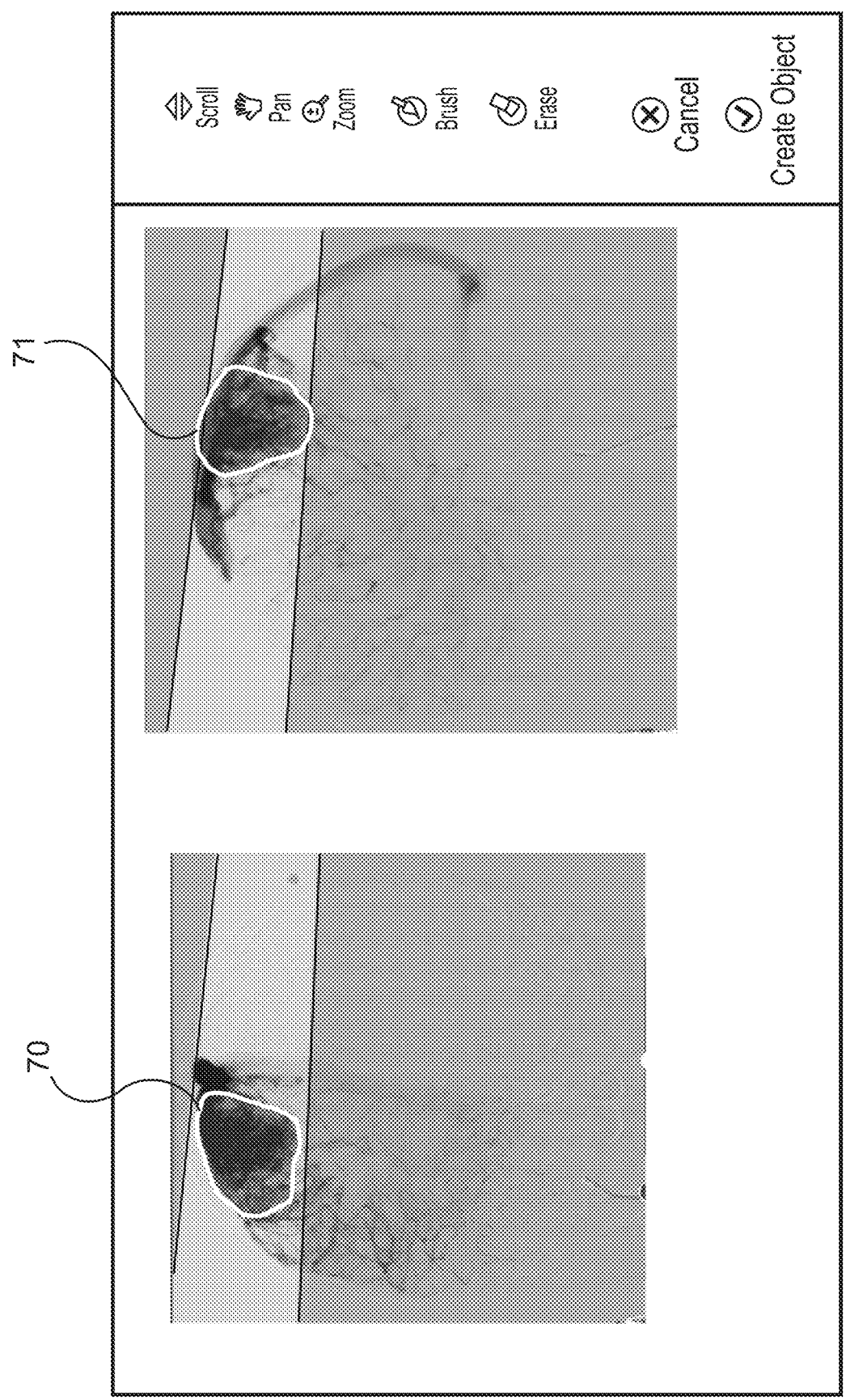
FIG. 7 schematically shows in accordance with an exemplary embodiment of the present invention that a contouring input can be received via a graphical user interface for two different DSA images taken from different imaging angles.

FIG. 7 schematically shows in accordance with an exemplary embodiment of the present invention that a contouring 70, 71 input can be received via a graphical user interface for two different DSA images taken e.g. from different imaging angles. In particular, the embodiment of the present invention shown in FIG. 7 can carried out as follows. First, the first and second 2D DSA images are displayed on a user interface and a first and a second contouring inputs, i.e. outlines 70, 71 are received via the user interface. As can be gathered from FIG. 7 the first contouring input represents a first outline 70 of the vascular malformation in the first 2D x-ray image data and the second contouring input represents a second outline 71 of the vascular malformation in the second 2D x-ray image data. Moreover, in this embodiment a first 3D object (not shown) is calculated based on the first outline and a second 3D object (not shown) is calculated based on the second outline. Further, the first and second 3D objects are intersected in a calculative manner thereby calculating the 3D representation of the vascular malformation.

Figure 8:
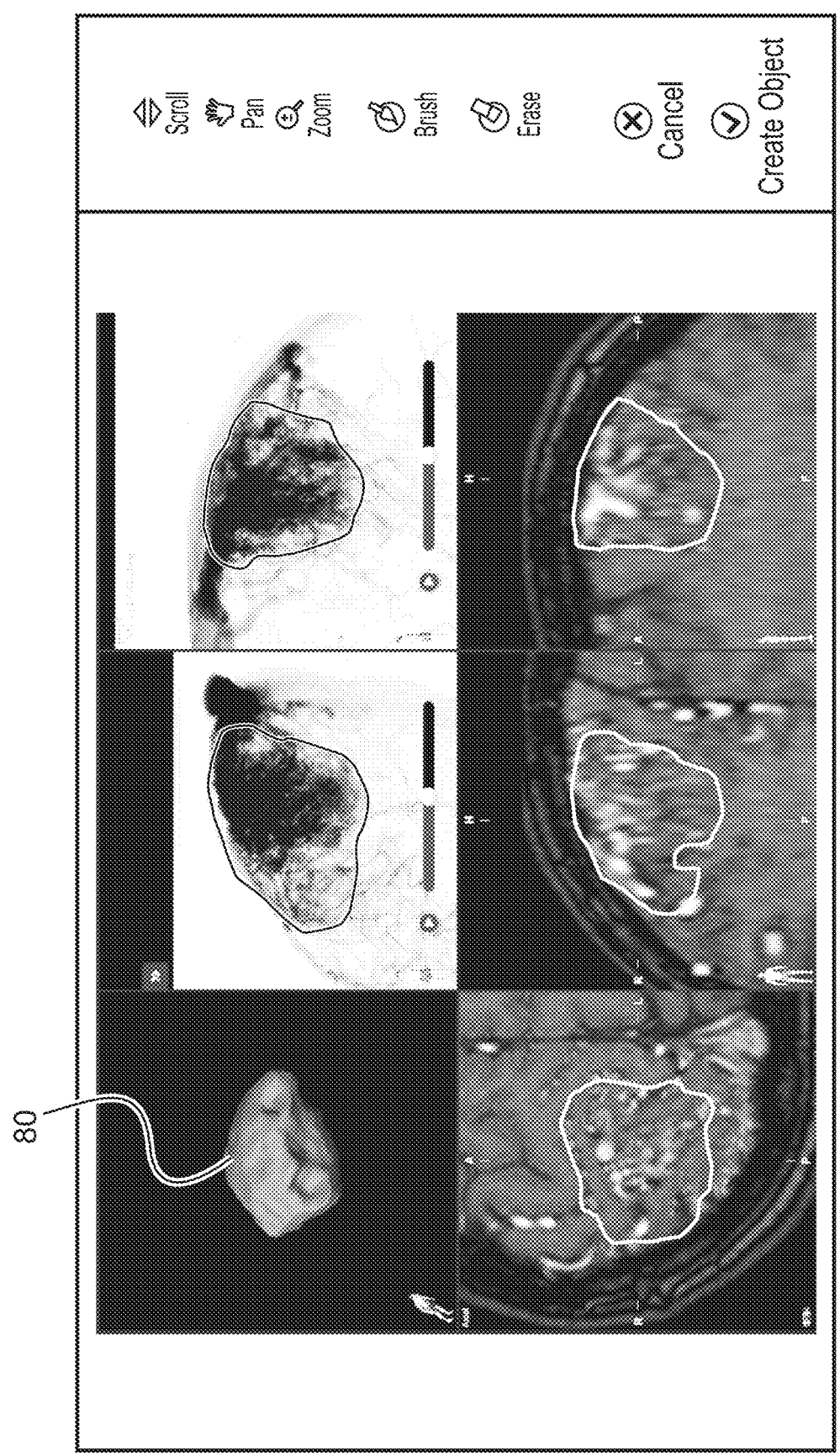
FIG. 8 schematically shows a resulting 3D representation of the vascular malformation calculated based on the determined vascular malformation of the co-registered 2D X-ray image data as shown e.g.

FIG. 8 schematically shows a resulting 3D representation 80 of the vascular malformation calculated based on the determined vascular malformation of the co-registered 2D X-ray image data as shown e.g. in FIG. 7 according to an exemplary embodiment of the present invention. The method explained for the embodiment of FIGS. 7 and 8 advantageously facilitates a frameless, anatomy based 2D/3D image registration, which is accurate inside of the patient's skull, which does not depend on vessel segmentation results and which allows focusing on the side of the vascular malformation, e.g. an AVM in a human brain region. As has been explained hereinbefore, the benefit of the high resolution and of the optical distinguishability between arterial inflow and venous outflow of the vascular malformation in 2D X-ray images is then transferred into the 3D data set by calculating the 3D representation of the vascular malformation. Due to the co-registered 2D X-ray image data and 3D image data, the representation of the vascular malformation can be calculated in the 3D coordination system. Thus, a 3D object of the vascular malformation can be generated, which very precisely takes into account the underlying vascular structure shown in the 2D X-ray image data.

Figure 9:
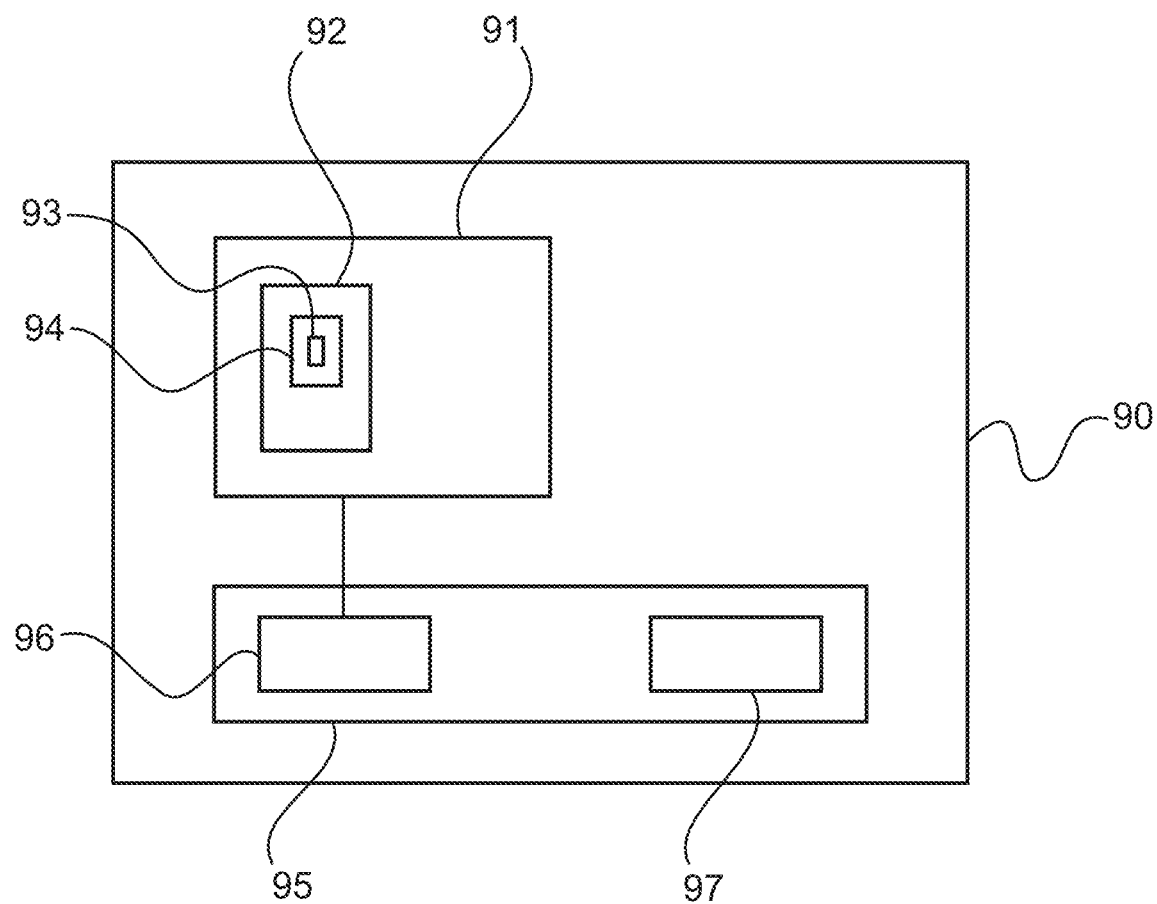
FIG. 9 schematically shows a radiotherapy treatment system for irradiating a vascular malformation, in particular an Arteriovenous malformation (AVM), with a treatment beam.

FIG. 9 schematically shows a radiotherapy treatment system 90 for irradiating a vascular malformation, in particular an Arteriovenous malformation (AVM), with a treatment beam. The system 90 comprises medical image analyzing system 91 and a radiation treatment apparatus 95. The radiation treatment apparatus 95 comprises a treatment beam source 96 and a patient support unit 97. The medical image analyzing system 91 comprises a computer 92 with a program storage medium 94, on which a program 93 is stored. Furthermore, the program 93, which is running on the computer 92 or when loaded onto the computer, causes the computer 92 to perform the method steps of the method according to the first aspect of the present invention, e.g. the method steps explained hereinbefore in the context of FIG. 1. The computer is operably coupled to the radiation treatment apparatus 95 for issuing a control signal to the radiation treatment apparatus for controlling at least one of the operation of the treatment beam source 96 or the position of the patient support unit 97.

The invention claimed is:

1. A computer-implemented medical method of 2D/3D image co-registration, the method comprising the steps:
    providing 2D X-ray image data of a vascular structure containing a contrast agent, wherein the vascular structure contains a vascular malformation,
    providing 3D image data of the vascular structure,
    transforming the 3D image data into transformed 2D image data,
    overlaying the 2D X-ray image data and the transformed 2D image data and calculating a correspondence between the 2D X-ray image data and the transformed 2D image data thereby determining a co-registration between the 2D X-ray image data and the 3D image data,
    determining in the co-registered 2D X-ray image data the vascular malformation, and
    calculating a 3D representation of the vascular malformation based on the determined vascular malformation of the co-registered 2D X-ray image data,
    wherein the vascular malformation is an Arteriovenous malformation, and
    wherein the 2D X-ray image data images the vascular structure and a distribution of the contrast agent in a distribution state, which allows for a distinction between arterial inflow into the Arteriovenous malformation and venous outflow of the Arteriovenous malformation, and
    wherein the 2D X-ray image data includes a plurality of images showing a time sequence of the distribution of the contrast agent in the vascular structure, and
    wherein the method further comprises the steps:
        identifying a best image out of the plurality of images with respect to the distinction between the arterial inflow into the Arteriovenous malformation and the venous outflow of the Arteriovenous malformation, and
        summing all images of the plurality of images up to a point of time at which the identified best image was generated.

2. The method according to claim 1,
    wherein the 2D X-ray image data is 2D digital subtraction angiography image data, and
    wherein the 3D image data of the vascular structure are MR image data.

3. The method according to claim 1,
    wherein the step of transforming the 3D image data into transformed 2D image data is carried out by calculating a projection or by calculating a reconstruction of the 3D image data.

4. The method according to claim 1,
    wherein for the transformation of the 3D image data into the transformed 2D image data a set of transformation parameters is used, and
    wherein the step of overlaying the 2D X-ray image data and the transformed 2D image data comprises the step:
    automatically optimizing the set of transformation parameters thereby optimizing a measure of image correspondence between the 2D X-ray image data and the respectively transformed 2D image data for a plurality of sets of transformation parameters.

5. The method according to claim 4,
    wherein the set of transformation parameters being optimized are projection parameters, or reconstruction parameters.

6. The method according to claim 4, the method further comprising the step:
    receiving a user input about initial values of the set of transformation parameters for the optimization.

7. The method according to claim 4 the method further comprising the step
    suggesting, based on image acquisition parameters of the 2D X-ray image data, initial values of the set of transformation parameters for the optimization.

8. The method according to claim 7,
    wherein the image acquisition parameters of the 2D X-ray image data are one or more of:
        two or more translational parameters,
        three rotational parameters,
        a scaling parameter, and
        a focal length.

9. The method according to claim 1,
    wherein the vascular structure is of a human brain,
    the method comprising the further step
    segmenting of at least one part of the human brain out of the 3D image data or the transformed 2D image data, and
    wherein only the at least one segmented part of the human brain is overlaid with the 2D X-ray image data.

10. The method according to claim 1, further comprising the step
    selecting a part of the provided 3D image data of the vascular structure for further use in the method,
    wherein the selection is carried out automatically or by automated ATLAS segmentation in combination with a user input, or purely based on a received user input.

11. The method according to claim 1,
    wherein the step of determining in the co-registered 2D X-ray image data the vascular malformation comprises the step:
    contouring the vascular malformation in the 2D X-ray image data, and
    wherein the 3D representation of the vascular malformation is calculated based on the contour of the vascular malformation in the 2D X-ray image data.

12. The method according to claim 1, further comprising the step
    receiving a user input associated with a contour of the vascular malformation in the 2D X-ray image data.

13. The method according to claim 1,
    wherein the provided 2D X-ray image data are at least a first and a second 2D X-ray image of the vascular structure,
    wherein the first 2D X-ray image was acquired with different acquisition parameters as compared to the second 2D X-ray image, and
    wherein the method is carried out for the first and the second 2D X-ray images.

14. The method according to claim 1,
wherein the 2D X-ray image data is 2D digital subtraction angiography image data,
wherein the step of overlaying the 2D X-ray image and the transformed 2D image is carried out with a first and a second digital subtraction angiography image,
wherein the first digital subtraction angiography image was acquired with different acquisition parameters as compared to the second digital subtraction angiography image,
wherein the first and second digital subtraction angiography images are overlaid with transformed 2D image data from the same 3D image data resulting in a first and a second overlay, the method further comprising the steps
displaying the first and second 2D X-ray image data on a user interface,
receiving a first and a second contouring input via the user interface,
wherein the first contouring input represents a first outline of the vascular malformation in the first 2D X-ray image data,
wherein the second contouring input represents a second outline of the vascular malformation in the second 2D X-ray image data,
the method further comprising the steps
calculating a first 3D object based on the first outline,
calculating a second 3D object based on the second outline, and
intersecting, in a calculative manner, the first and second 3D objects, thereby calculating the 3D representation of the vascular malformation.

15. The method according to claim 1, the method further comprising the steps
carrying out a texture based image analysis of the calculated 3D representation of the vascular malformation, and
refining the calculated 3D representation of the vascular malformation using a result of said texture based image analysis.

16. A non-transitory computer readable storage medium comprising instructions that when executed on at least one processor of at least one computer, causes the at least one computer to perform the steps of:
providing 2D X-ray image data of a vascular structure containing a contrast agent, wherein the vascular structure contains a vascular malformation,
providing 3D image data of the vascular structure,
transforming the 3D image data into transformed 2D image data,
overlaying the 2D X-ray image data and the transformed 2D image data and calculating a correspondence between the 2D X-ray image data and the transformed 2D image data thereby determining a co-registration between the 2D X-ray image data and the 3D image data,
determining in the co-registered 2D X-ray image data the vascular malformation, and
calculating a 3D representation of the vascular malformation based on the determined vascular malformation of the co-registered 2D X-ray image data,
wherein the vascular malformation is an Arteriovenous malformation, and
wherein the 2D X-ray image data images the vascular structure and a distribution of the contrast agent in a distribution state, which allows for a distinction between arterial inflow into the Arteriovenous malformation and venous outflow of the Arteriovenous malformation, and
wherein the 2D X-ray image data includes a plurality of images showing a time sequence of the distribution of the contrast agent in the vascular structure, and
wherein the instructions, when executed on the at least one processor of the at least one computer, further cause the at least one computer to perform the steps of:
identifying a best image out of the plurality of images with respect to the distinction between the arterial inflow into the Arteriovenous malformation and the venous outflow of the Arteriovenous malformation, and
summing all images of the plurality of images up to a point of time at which the identified best image was generated.

17. A radiotherapy treatment system for irradiating a vascular malformation, in particular an Arteriovenous malformation, with a treatment beam, the system comprising:
at least one computer having at least one processor and associated memory, the memory storing instructions which when executed cause the at least one processor to:
provide 2D X-ray image data of a vascular structure containing a contrast agent, wherein the vascular structure contains the vascular malformation,
provide 3D image data of the vascular structure,
transform the 3D image data into transformed 2D image data,
overlay the 2D X-ray image data and the transformed 2D image data and calculating a correspondence between the 2D X-ray image data and the transformed 2D image data thereby determining a co-registration between the 2D X-ray image data and the 3D image data,
determine in the co-registered 2D X-ray image data the vascular malformation, and
calculate a 3D representation of the vascular malformation based on the determined vascular malformation of the co-registered 2D X-ray image data,
wherein the vascular malformation is an Arteriovenous malformation, and
wherein the 2D X-ray image data images the vascular structure and a distribution of the contrast agent in a distribution state, which allows for a distinction between arterial inflow into the Arteriovenous malformation and venous outflow of the Arteriovenous malformation, and
wherein the 2D X-ray image data includes a plurality of images showing a time sequence of the distribution of the contrast agent in the vascular structure, and
wherein the instructions, when executed, further cause the at least one processor to:
identify a best image out of the plurality of images with respect to the distinction between the arterial inflow into the Arteriovenous malformation and the venous outflow of the Arteriovenous malformation, and
sum all images of the plurality of images up to a point of time at which the identified best image was generated.

* * * * *